Dec. 16, 1958  J. HAMNETT  2,864,336
INCUBATOR FOR INCUBATING EGGS
Filed Oct. 1, 1954  3 Sheets-Sheet 1

INVENTOR
James Hamnett
BY Robb & Robb
ATTORNEYS

Dec. 16, 1958  J. HAMNETT  2,864,336
INCUBATOR FOR INCUBATING EGGS
Filed Oct. 1, 1954  3 Sheets-Sheet 2

INVENTOR
James Hamnett
BY Robert Robb
ATTORNEYS

Dec. 16, 1958   J. HAMNETT   2,864,336
INCUBATOR FOR INCUBATING EGGS
Filed Oct. 1, 1954   3 Sheets-Sheet 3

INVENTOR
James Hamnett
BY Robb & Robb
ATTORNEYS

United States Patent Office 2,864,336
Patented Dec. 16, 1958

2,864,336
INCUBATOR FOR INCUBATING EGGS

James Hamnett, Broughton, England

Application October 1, 1954, Serial No. 459,822

3 Claims. (Cl. 119—40)

This invention is concerned with the provision of an improved incubator for incubating eggs.

Incubators have been known for many years and a number of independent investigations have been undertaken with a view to improving the efficiency of incubators so that a higher proportion of fertile eggs may hatch. I have carried out a series of experiments in connection with the incubation of eggs and I have carefully observed hens sitting on eggs. On the average it has been established that hens move their eggs or at least some of them by varying amounts, about 90 times every 24 hours and by move the eggs I mean that the hen turns them and/or alters their angle of tilt. The reason for moving the eggs is not thoroughly understood but most authorities believe that it is to bring the embryo into contact with fresh egg material to provide the embryo with a constant supply of nourishment and also to prevent the embryo adhering to the inside of the shell at any one point.

I believe that a satisfactory incubator should make provision for turning the eggs from time to time relatively to their long axis and for tilting the eggs relatively to their short axis so that they lie with their small end down and their large end up. In addition the conditions of temperature, humidity and $CO_2$ content within the incubator should be controlled.

I have made experiments in connection with turning and tilting movements in incubators and I have found that I obtain a higher percentage of hatchings if the eggs, during incubation, are moved into a number of different positions by turning and/or tilting. I have therefore designed an incubator in which the eggs may be moved into many different positions during incubation. My experiments have shown that this method gives improved results and I believe that this is due to the fact that the different positions into which the eggs may be moved give a set of conditions approximating more closely to natural hatching.

According to the present invention I provide an incubator having an angularly displaceable drum-like container provided with segmentally disposed frames to receive eggs, the arrangement being such that the eggs may be moved into a number of different positions during incubation by selective angular displacement of the container while at all times maintaining the eggs tilted into such a position that the large end of each egg is above the small end. The drum-like container which may be a true cylinder or which may have any other convenient shape may be selectively angularly displaceable first in one direction and then in the other or may be selectively rotatable and I prefer to use a rotatable cylindrical drum-like container. The segmentally disposed frames are preferably arranged at right angles to the axis of the drum-like container and in the preferred arrangement with a horizontal container the frames are arranged vertically. The frames may be provided with egg holding devices including a separate clip for each egg to maintain the eggs tilted into such a position that the large end of each egg is above the small end. The frames may comprise perforated trays or may comprise an outer rim member to which cross bars may be connected. The clips may be pivotally connected to the frames in rows so that the eggs may be disposed in an orderly manner within the incubator.

The segmentally disposed frames may be arranged to meet around the axis of the drum-like container in such a manner as to leave an axial passageway along which warm air may be directed during its circulation within the container.

I have used the expression selective angular displacement in this specification and by this expression I mean that the container is angularly displaced at intervals through a selected predetermined number of degrees to bring the eggs successively into a number of different positions. The angular displacement may be backwards and forwards through different angles or may be always in the same direction so that the container undergoes a step by step rotary movement.

In order that the invention may be clearly understood and readily carried into effect, reference is now directed to the accompanying drawings in which.

Figure 1:
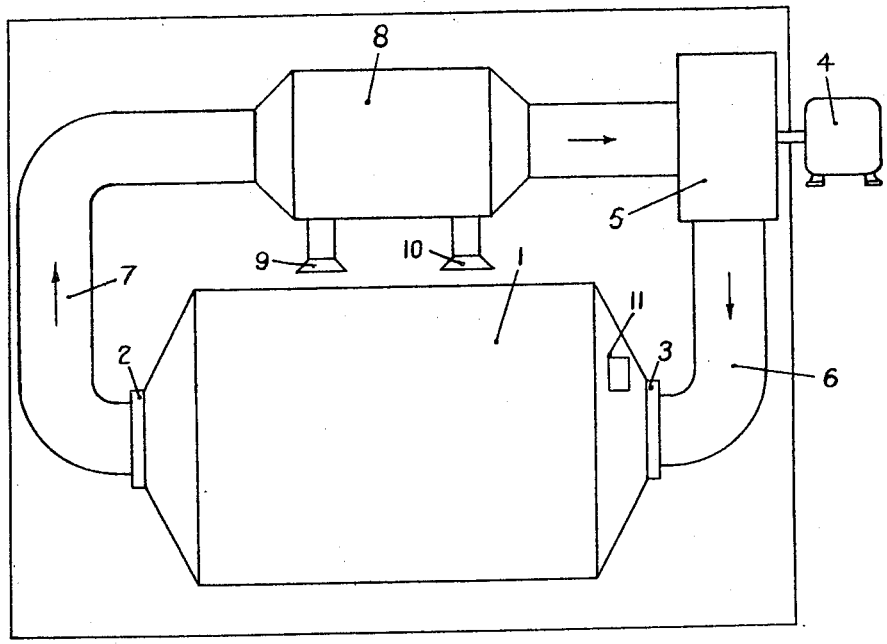
Figure 1 illustrates diagrammatically the general arrangement of an incubator according to the invention.

In Figure 1 a drum-like container 1 forming an egg chamber is rotatably mounted on bearings at 2 and 3 for rotation about a horizontal axis. The container 1 is adapted to receive segmentally disposed frames carrying eggs, the long axis of the eggs being true to the centre line of the container and each egg being tilted to an appropriate angle with the large end uppermost. An electric motor (not shown) provides power to turn the container. The electric motor is adapted to drive a shaft provided with a conventional form of gearing (not shown) adapted to transmit the drive to gearing (not shown) associated with the drum-like container 1. Conventional control mechanism (not shown) is provided to regulate the movements of the drum so that the drum is turned through a pre-determined angular displacement or rotary movement at pre-determined time intervals.

An electric motor 4 drives an air circulating fan 5 which is disposed in the same chamber as an air heater. The air heater is not shown in Figure 1 but has the reference 15 in Figures 2 and 3. The fan drives the air past the heater and down a duct 6 into the container 1. The warm air passes over and around the eggs in the container 1 and passes out at the other end along a duct 7 to an air conditioning chamber 8 adapted to regulate the conditions of temperature, humidity and $CO_2$ content. An air intake is provided at 9 and an air outlet at 10.

The temperature inside the egg chamber should be maintained at about 100° F. and the $CO_2$ content at less than .5%. This maximum value of .5% is an average based on incubators containing three equal settings of eggs at weekly intervals. At the beginning of incubation eggs give off a very small quantity of $CO_2$ and are thought by many research workers to benefit from a concentration during the first few days. The rate of output of $CO_2$ increases consistently and fairly rapidly as incubation proceeds but CO₂ tolerance does not increase at least not to the same extent and it may even decrease. I have found that CO₂ output on the 18th day may be 70 times greater than on the first day and I believe that improved incubating conditions would result from providing different CO₂ concentrations at different stages of incubation. It is a feature of the present invention to provide means for regulating the CO₂ content in the container. The humidity is not so important and there is a tolerance of 5% in humidity. If desired a thermostat of conventional form (not illustrated in detail) may be provided at 11 for control of a heater denoted 15 in Figure 2, to ensure that the air entering the egg chamber is as nearly as possible at the correct temperature.

It will be understood that the drum-like container 1 may be of any convenient shape in cross-section for example it may be circular so that the container 1 is a cylinder. The container may be divided longitudinally into a desired number of segmental compartments to receive the segmentally disposed frames. By segmentally disposed frames I mean frames inserted from the side of the container 1 inwardly towards the centre axis substantially in the manner illustrated in the drawings and preferably at right angles to the axis. My frames may have the appearance of a perforated tray but I do not refer to trays of eggs since my frames are used on their side in a substantially vertical position.

If desired my frames may comprise a rim member with a series of cross bars to which egg holding devices including clips may be secured.

I may use any convenient number of segmentally arranged compartments for example four and the compartments may be shaped to receive any desired number of segmentally arranged frames depending upon the length of the container 1. In the drawings I have illustrated an embodiment of the invention with four compartments each adapted to receive a number of segmentally arranged frames.

In operation I prefer to follow a setting routine involving loading one-third of the incubator with eggs every week. The first lot of eggs would be distributed in the segments at the end of the egg chamber where air enters. The second lot of eggs in the segments at the centre of the egg chamber and the third lot at the end of the egg chamber where air leaves. Since the air is reconditioned in the appropriate chamber by introduction of fresh air and exhaustion of vitiated air, it would be at its freshest as it enters the egg chamber. When the first lot of eggs are removed on the 18th or 19th day for transfer to the chick hatcher the eggs remaining in the incubator would be moved towards the air entry. On the 21st day another lot of eggs would be put into the place previously occupied by the third setting and so on. In this way once the incubator is fully loaded the eggs during their first week would have the benefit of air with a relatively high CO₂ content and the second and third lots as they are moved towards the air inlet would be incubating in air with progressively lower contents of CO₂.

Figure 2:
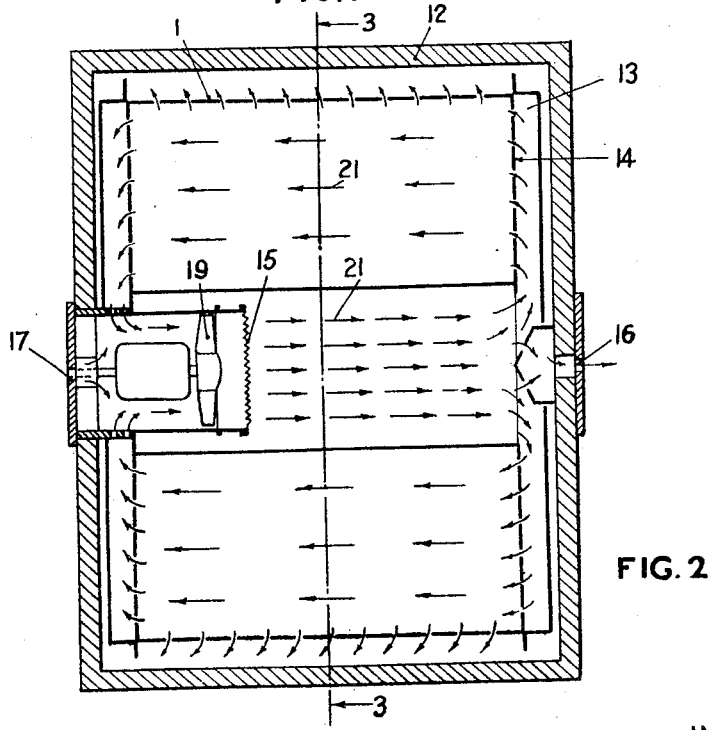
Figure 2 is a longitudinal section on the line 2—2 of Figure 3 of one form of container and Figure 3 is a section on the line 3—3 of Figure 2.

The various units illustrated in Figure 1 may be enclosed in an outer cabinet which may be of any suitable shape and size and which is provided with suitable doors to enable frames to be inserted into and removed from the container 1. In Figure 2 a cabinet is indicated at 12, 13 is a pressure box, 14 are perforated screens, 15 is a heater, 16 is an exhaust for foul air and 17 a clean air intake. A suitable blower or fan 19 is arranged to drive the main air stream through the container in the direction of the arrows 21. The air stream as it flows through the container warms the eggs indicated diagrammatically at 22 and then returns to the fan 19 axially of the container so that air is circulated as shown.

Figure 3:
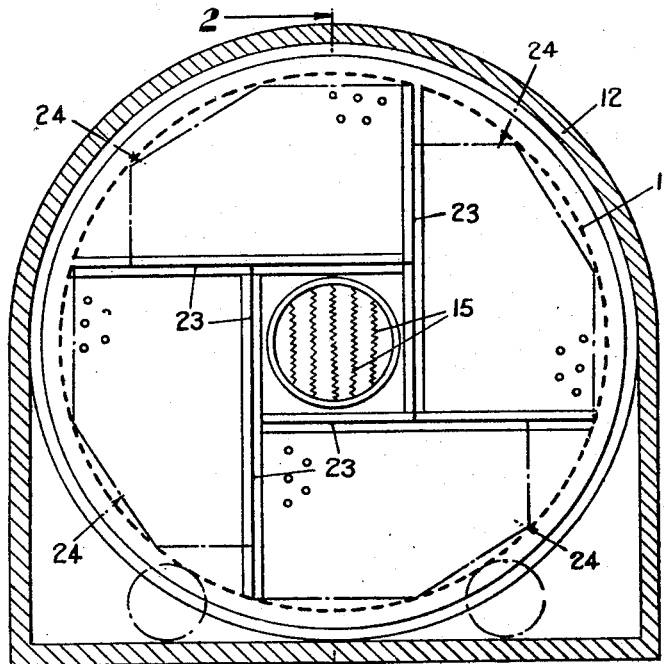
Figure 4:
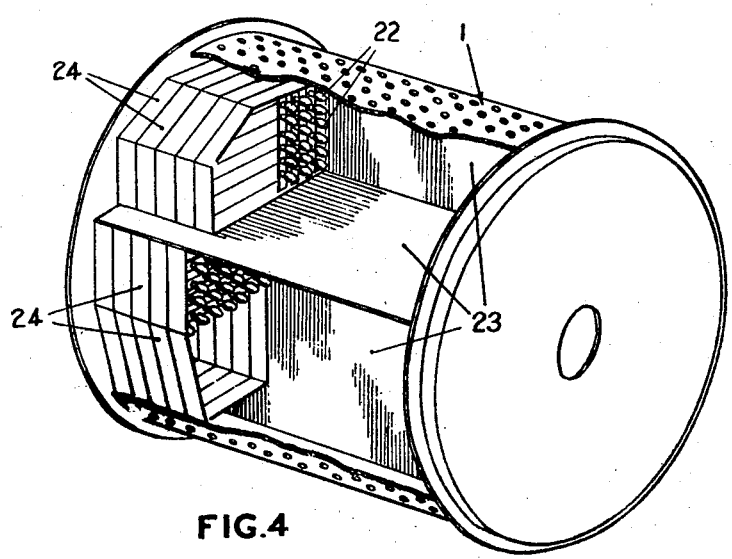
Figure 4 is a sectional perspective view of the container shown in Figure 2 the cabinet being omitted.

In Figures 3 and 4 the general construction of the container 1 is readily apparent, the same references are used as in Figure 2 and in addition Figures 3 and 4 show longitudinal walls 23 of which there may be four to divide the container into four segmental compartments. The reference 24 indicates the frames referred to above which receive eggs and which are disposed in a vertical plane. The frames 24 with the eggs each held in an individual clip are inserted in a vertical plane into the container so that each frame substantially represents a segment of the cylindrical container.

Figure 5:
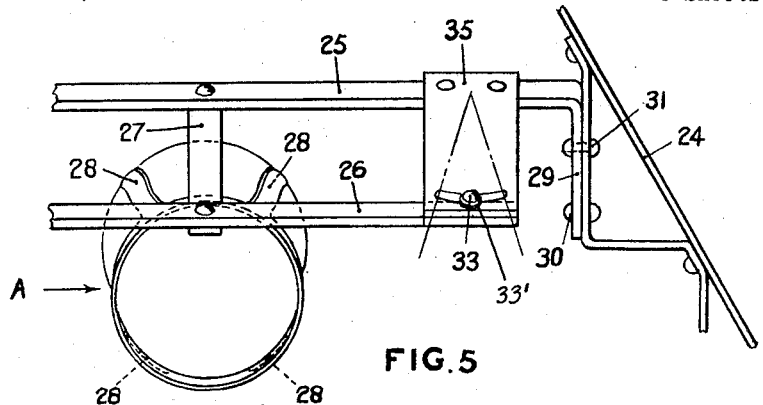
Figures 5 and 6 are respectively a fragmentary elevation and side view in the direction of the arrow A of one form of holding device for eggs.
Figure 6:
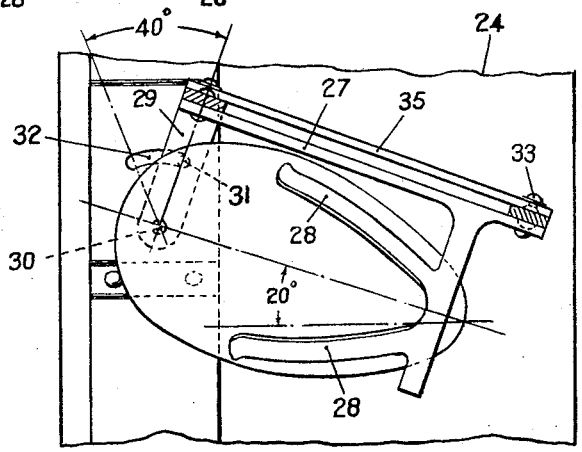

Figure 5 is a fragmentary elevation of a holding device for the eggs, one such device being provided in each tray for each row of eggs therein, and Figure 6 is an elevation viewed in the direction of arrow A. Each device comprises two substantially parallel bars 25, 26 to which are pivotally connected cross members 27 which mount metal or plastic clips 28 for holding an egg. At each end of the bar 25 is an arm 29 which is pivoted as at 30 to a fitment connected to the adjacent side of the tray. Fixed to each arm 29 is a pin 31 which moves in an arcuate slot 32 in the fitment which provides for an angular displacement of the egg holding device through 40°. It will be seen that the arrangement shown provides for the longitudinal axes of the eggs to be tilted at an angle of 20° with respect to the axis of the cylindrical egg chamber but as the weight of the eggs is borne remotely from the pivot 30 it will be clear that during the movement of the egg chamber through 180° the egg holding devices will each move about their pivots 30 and thus the eggs will be maintained automatically at the desired tilt with their large ends uppermost. At the ends of each bar 26 is a pin 33 which moves in an arcuate slot 33′ formed in a plate 35 secured to the bar 25. Thus, during the rotation, or partial rotation of the egg chamber, the bar 26 will move relatively to the bar 25, due to the weight of the eggs, with the result that a slight turning movement will be given to the eggs and also their longitudinal axes will be inclined from side to side.

Figure 7:
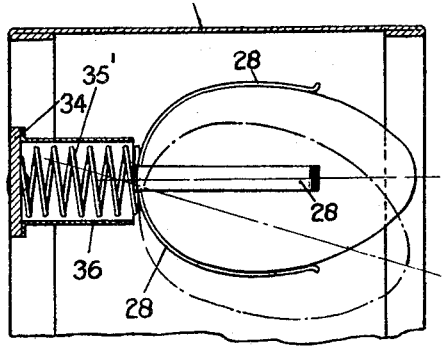
Figure 7 is a fragmentary sectional elevation of another form of holding device and Figure 8 is an end elevation of a modified form of egg holding device drawn to an enlarged scale.

In Figure 7 each frame 24 has side walls 33′ and cross-members or bars 34 to each of which are secured a number of coiled springs 35′ in such a way that a row of coiled springs 35′ is provided on each bar 34. A clip 28 is connected as shown to the end of each spring 35′ the arrangement being such that when an egg is inserted into the clip 28 the spring sags and the egg is tilted. If therefore all the eggs are inserted into the clips with the large end first then, no matter what the position of the container may be, all the eggs will be retained with the large end uppermost. In order to regulate the degree of tilt each spring 35′ may be surrounded by a tube 36 to limit the sag of the spring.

Figure 8:
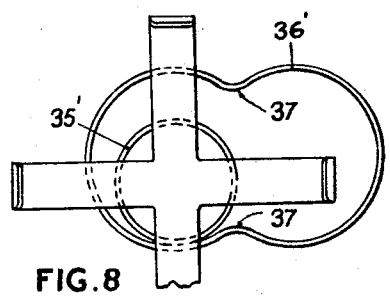

There may be certain advantages in giving the eggs a rocking movement from time to time and to do this the springs 35′ may be surrounded by a tube 36′ with two humps 37 as shown in Figure 8. From time to time the spring 35′ will roll over a hump 37 and in doing so the egg will be rocked.

In operation using egg holding devices as illustrated in Figures 5 and 6 the eggs to be incubated are inserted into the clips and the frames are placed in the egg chamber within the container which has been brought to the proper conditions of temperature, humidity and CO₂ content. After say one hour the container may be automatically turned from its initial position through say 175° into a second position. During this turning movement every egg is moved into a new position all the eggs being turned around their long axis and all the eggs settling in the new position into a different degree of tilt. The container may stay in the new position for one hour and may then be turned again in the same direction through another 175° thus bringing the container back to within 10° of its original position for the third position, the fourth position will then be ten degrees different from the second position and so on. With this method of turning the container each egg may occupy 36 different positions before the first position is repeated. Naturally the above is given merely by way of example and by adjusting the degree of turning of the container more or less positions may be afforded for example by turning the container through 179° at each movement instead of 175° the chamber may occupy 360 different positions and so on. Instead of always turning in one direction the container may be turned first one way e. g. clockwise by say 170°, then the other way e. g. counterclockwise by 180° and so on.

If the clips illustrated in Figure 7 are used then the angle of tilt of each egg will be substantially the same in every position however the eggs will be moved by turning into any desired number of different positions.

I claim:

1. An incubator comprising an angularly displaceable drum-like container, segmentally disposed frames for insertion into and removal from the drum-like container in a direction tangential to an axial passage formed by the inner ends of such frames, clips connectively associated with the frames each adapted to receive a single egg, said clips being constructed to support the egg only with the large end nearest the connection of the clip and frame and thus the large end first, a coiled spring to connect each clip to the frame so that the spring mounted clips sag downwards as soon as an egg is inserted, supports to prevent the spring mounted clips sagging beyond a predetermined amount and means to turn the drum-like container on its axis whereby the eggs may be moved into a number of different positions during incubation by selective angular displacement of the container while at all times the clips maintain the eggs tilted into such a position that the large end of each egg is above the small end.

2. An incubator comprising an angularly displaceable drum-like container, segmentally disposed frames for insertion into and removal from the drum-like container in a direction tangential with respect to an axial passage and clips associated with each frame each adapted to receive a single egg and to hold the egg in a tilted position at all times with the large end of the egg above the small end, whereby the eggs may be moved into a number of different positions during incubation by selective angular displacement of the container while the clips maintain the egg in the correct tilted position, said segmentally arranged frames being provided with rows of egg-holding devices connected thereto, each comprising a clip to receive an egg, said clips being constructed to support the egg only with the large end nearest the connection of the clip and frame and thus the large end first, a coiled spring to connect the clip to the frame, and a support to prevent the spring from sagging beyond a pre-determined amount.

3. An incubator comprising a cylindrical drum-like container having an outer shell and pivotally mounted upon its horizontal axis, a heating means extending along said axis, a plurality of substantially segmental egg-holding frames stacked in said drum, said frames having a thickness greater than the length of an average egg and a first side of a length approximately equal to the radius of said drum, one end of said side being adjacent said heating means, and the other end extending outwardly toward said shell, a second side of said frame being in abutting relationship with a first side of an adjacent frame, and egg holding clips resiliently mounted in said frame to receive a single egg lengthwise thereof, said clips being constructed to support the egg only with the large end nearest the connection of the clip and frame and thus the large end first.

References Cited in the file of this patent

UNITED STATES PATENTS

| | | |
|---|---|---|
| 404,041 | Hile | May 28, 1889 |
| 786,256 | Axford | Apr. 4, 1905 |
| 1,062,687 | Axford | May 27, 1913 |
| 2,328,347 | Kuo | Aug. 31, 1943 |
| 2,364,722 | Kazantzeff | Dec. 12, 1944 |
| 2,564,508 | Seocat | Aug. 14, 1951 |

FOREIGN PATENTS

| | | |
|---|---|---|
| 337,901 | Great Britain | Nov. 13, 1930 |
| 138,574 | Austria | Aug. 25, 1934 |